United States Patent Office 2,985,243
Patented May 23, 1961

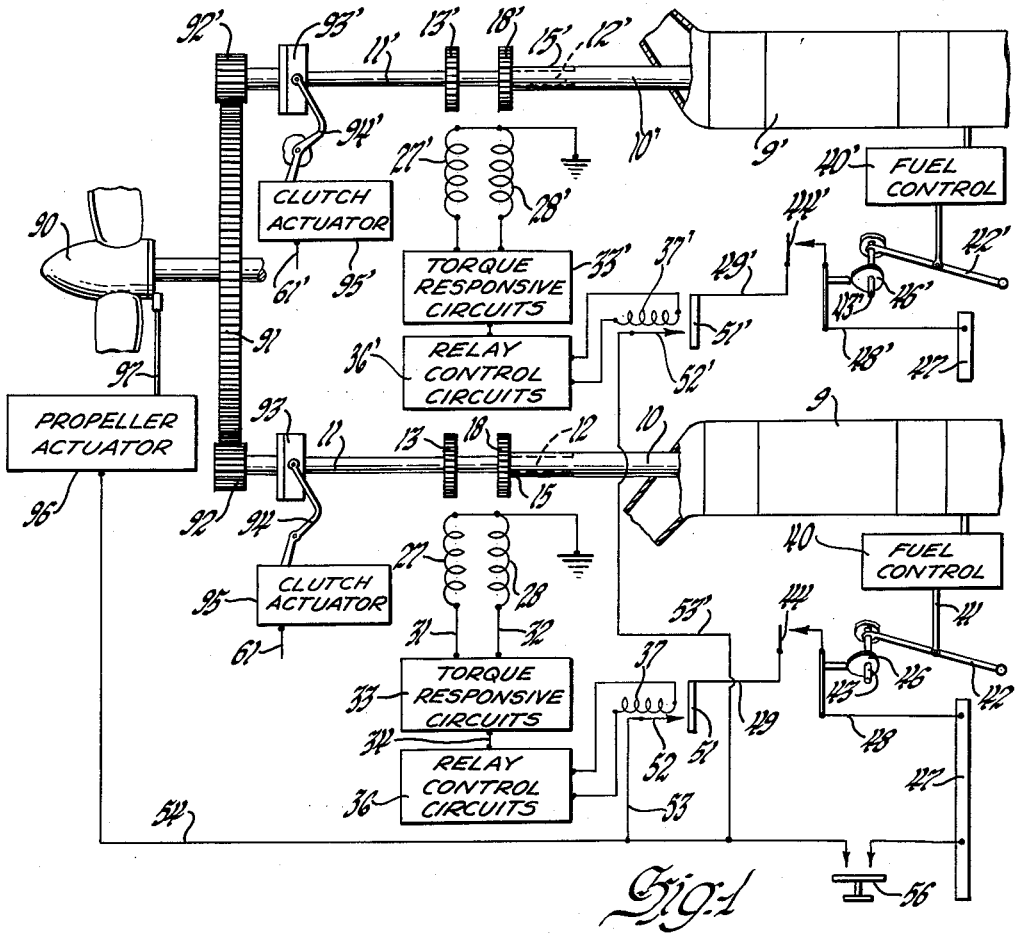

2,985,243
TORQUE-ACTUATED ENGINE CONTROL

Russell D. Tyler and John M. Whitmore, Indianapolis, Ind., assignors to General Motors Corporation, Detroit, Mich., a corporation of Delaware Original application June 29, 1951, Ser. No. 234,308, now Patent No. 2,766,617, dated Oct. 16, 1956. Divided and this application Sept. 13, 1956, Ser. No. 609,621

3 Claims. (Cl. 170—135.72)

Our invention relates to torque responsive controls for eliminating or reducing drag on an aircraft resulting from a failed power plant, as by feathering or declutching the propeller of the power plant.

This application is a division of our application Serial No. 234,308 for Torquemeter, filed June 29, 1951 (now Patent No. 2,766,617), directed to apparatus for measuring the torque exerted by or upon a shaft which may couple an engine to a load such as a propeller. This application is directed to aircraft power plant controls actuated by a torque responsive apparatus, which may be that which forms the subject matter of the parent application.

A feature of the present invention is that it provides torque responsive control means for feathering or declutching the propeller of an aircraft in the event the torque developed by the engine drops below a predetermined level.

The nature of the invention and the advantages thereof will be clearly apparent to those skilled in the art from the succeeding detailed description of preferred embodiments of the invention and the accompanying drawings.

Fig. 1 is a schematic diagram of a dual engine propeller combination with torque responsive feathering control according to the invention.

Fig. 2 is a fragmentary schematic view illustrating the modification of Figure 1 to provide declutching control.

Fig. 3 is a schematic of a fragmentary portion of Figure 1 illustrating a modified declutching system.

Fig. 4 is a schematic of a fragmentary portion of Figure 1 illustrating a modification of the feathering system.

Before proceeding with the description of the control system, it may be pointed out that the details of the preferred means by which the torque is measured and the measurement of torque is caused to operate a control instrumentality, specifically a relay, are omitted from this application because these details are immaterial to an understanding of the present invention. They are fully disclosed in our Patent No. 2,766,617.

Also, details of the known devices and circuits by which the clutch is engaged and released and of the actuator which controls the propeller and the connections thereto are omitted from the drawings. Clutch and propeller control circuits, which are quite complex in their entirety, are disclosed in the application of Irwin et al. for Control System for Turboprop Engines, Serial No. 194,716, filed November 8, 1950 (now Patent No. 2,851,113), of common ownership with this application. Sufficient of the subject matter of the Irwin et al. application is illustrated herein to facilitate an understanding of the present invention, and the Irwin et al. patent may be referred to for details of the systems shown therein if such reference is required.

Proceeding now to the general description of an installation embodying the invention, with reference to Fig. 1, the reference character 9 designates power means, here illustrated as an aircraft gas turbine engine or power section having a power output shaft 10, and reference character 90 designates a load, here illustrated as a propeller connected through gears 91 and 92 to a load input shaft 11. A known clutch illustrated diagrammatically at 93 may be controlled through mechanical linkage 94 by a known clutch actuator 95. The propeller may be feathered through a known propeller actuator 96 which is coupled to the propeller through a mechanical linkage indicated at 97. The apparatus illustrated includes dual power units 9, parts of the second power unit being designated by reference characters with a prime.

A torque shaft 12 is coupled at one end to the engine output shaft 10 and at the other end to the load input shaft 11. Adjacent the propeller or load end of the torque shaft 12 is a flange 13 having extending radially therefrom a number of equally spaced rectangular teeth or projections. A hollow reference shaft 15 is fixed at one end to the torque shaft 12 adjacent the engine end of the torque shaft. The other end of reference shaft 15 is freely rotatable relative to the torque shaft 12 at the other or load end. The free end of shaft 15 bears a toothed flange 18 similar to the toothed flange 13.

Torque between the engine 9 and propeller 90 twists the torque shaft 12, creating an angular displacement between the teeth on the flanges 13 and 18. The flanges 13 and 18 cooperate with magnetic pickup coils 27 and 28 to generate alternating current signals. The phase displacement of these signals is a linear function of the torque transmitted. Since the pickup coils are circumferentially displaced, the signals generated in them will be slightly out of phase under zero torque conditions and the phase displacement will increase as the torque delivered from the engine to the propeller increases.

The outputs of the pickup coils 27 and 28 are fed through leads 31 and 32, respectively, to torque responsive circuits 33 of an electronic torquemeter as described in our parent application. The torque responsive circuits generate a pulsating current, the amplitude of the pulses of which is constant. The ratio of the duration of the pulse to the total period of one cycle is proportional to the phase displacement of the signals from the pickup coils. The average E.M.F. is therefore proportional to the value of torque above the reference value of torque at which the currents are in phase. Since the currents are slightly out of phase at zero torque, the reference torque level is negative; or, in other words, represents a transmission of torque from the propeller to the engine in a reverse direction to the torque exerted when the engine is driving the propeller.

The output of the torque responsive circuits 33 is fed through lead 34 to relay control circuits 36 which determine the average value of the pulsating E.M.F. and energize a relay 37 when the E.M.F. and, therefore, the measured torque, falls below a value for which the relay control circuits are set. The mechanical and electrical details of the apparatus by which the relay is energized when torque falls below a predetermined level will not be further described but are described in our application Serial No. 234,308, now Patent No. 2,766,617.

The relay coil 37 may be employed in various ways to effect control of the power plant; for example, to feather the propeller or declutch the engine from the propeller, when torque falls below a predetermined level.

Figure 1 illustrates a system for feathering the propeller in the event engine power falls below about 55 percent of rated value during take-offs. The controlling devices for the engine and propeller shown in part in Fig. 1 include a fuel control 40 for each engine which determines the quantity of fuel supplied to the engine and thereby its power output. The fuel control is set to the desired power level by a link 41 connected to a pilot's settable power control lever 42 rotatably mounted on a shaft 43. Any suitable switch mechanism, such as the normally open switch 44 operated by cam 46 on shaft 43, is closed when the power control is moved to the maximum power position for take-off of the aircraft. One terminal of switch 44 is connected to a power supply bus 47 by lead 48. The other terminal of switch 44 is connected by lead 49 to normally open contact 51 actuated by relay coil 37. When the relay coil is energized by the control circuit 36 upon reduction of torque below 55 percent of rated value, it closes contact 51 on contact 52 connected through lead 53 to a lead 54 which runs to the propeller actuator 96. Energization of lead 54 causes the propeller actuator to feather the propeller 90. Lead 54 may also be energized from bus 47 by normally open manually operable feather switch 56 so that the relay 37 energizes the same feathering circuit as that energized by the pilot when he operates the manual feathering switch 56. Incidental relay circuits between the lead 54 and the propeller actuator which are shown in the Irwin et al. patent previously referred to are omitted from this application. Lead 54 and switch 56 of this application may correspond to lead 288 and switch 74 of Irwin et al.

Since the contacts 51' and 52' of relay coil 37' are connected to the bus 47 through switch 44' and to lead 54 through lead 53', loss of torque of either engine 9 will cause feathering of the propeller.

Figure 2 illustrates a circuit in which loss of power from either engine will cause the clutch of that engine to be disengaged. Figure 2 shows only the parts of the circuit which differ from Fig. 1, the remaining circuits being identical to those shown in Fig. 1. Corresponding parts in Figs. 1 and 2 are identified by the same reference numerals. In the clutch actuating system of Figure 2, leads 53 and 53' are omitted and relay contacts 52 and 52' are connected through leads 61 and 61' to the clutch actuators 95 of the corresponding power units. Lead 61 may correspond to lead 209 shown on Fig. 7 of the Irwin et al. patent. With the system of Fig. 2, loss of power below the predetermined level by either unit while the power control 42 of that unit is in the take-off position will energize the clutch actuator to declutch that unit from the propeller.

As will be apparent, if the power demand is reduced by moving the power control 42 to a low power position, switch 44 will open and the automatic feathering or declutching circuits of Figs. 1 or 2 will be inoperative.

Figures 3 and 4 illustrate circuit arrangements for control of the clutch and propeller, respectively, in the event power falls near zero, or even in the event negative torque is developed, in order to declutch or feather a propeller at all times when the engine fails or is throttled down. These figures show circuits for a single power unit driving a propeller. If two power units drive a single propeller, the circuits will be duplicated as in Figs. 1 and 2.

Depending upon the power level at which actuation of the system of Fig. 3 or 4 is desired, the relay control circuits 36 will be set to energize relay 37 at a low level of torque in the normal direction or a value of negative or reverse torque. The systems of Figs. 3 and 4 differ from those of Figs. 2 and 1, respectively, in that the power lever position controlled switch 44 is eliminated so that torque responsive declutching or feathering may be effected at any power lever position when the torque output decreases below the predetermined value. In the system of Figs. 3 or 4, relay contact 51 is connected directly to lead 48 energized from bus bar 47.

In any of the embodiments of the invention the torque responsive control provides immediately for elimination of drag on the aircraft in the event of engine failure, due to a windmilling propeller driving the engine, either by declutching the propeller from the engine or by feathering it. While the invention is illustrated in Figs. 1 and 2 in connection with a power plant in which two power units are coupled to a single propeller, it will be apparent that the torque responsive controls may be used in an installation where a single power unit is coupled to a propeller. A single power unit installation would necessitate merely the elimination of the primed parts of Figure 1 or Figure 2. Conversely, Figs. 3 and 4 show connections for a single power unit, which would be duplicated as in Figs. 1 and 2 for a double unit power plant.

By way of background, it may be pointed out that propellers operable to feather in response to an electrical signal are well known. Such propellers, or systems embodying them, are shown, for example, in U.S. Patents 2,595,345, 2,601,902, 2,605,849, 2,699,304, 2,699,312, and 2,851,113. References to such installations in actual use may be found, for example, in Aviation Week, June 28, 1948, pages 23 and 24, and April 23, 1951, page 22.

It may also be noted that clutches including actuators such that the clutch may be disengaged by an electrical signal are well known. Such electrically-released clutches are disclosed, for example, in U.S. Patents 2,462,824, 2,838,913, and 2,851,113. The system shown in the last two patents mentioned was in use in the XP5Y-1 flying boat referred to in Aviation Week, April 23, 1951, pages 21 to 28, and in the paper by Loomis and Shannon referred to in the footnote on page 21.

The advantages of the invention will be apparent to those skilled in the art from the foregoing description of preferred embodiments. They make possible greater safety of the aircraft by eliminating, immediately upon failure of a power plant, a condition of drag on the aircraft which would result from the propeller driving the failed power plant.

The description of the preferred embodiments for the purpose of explaining the invention is not to be construed as limiting or restricting the invention as many modifications may be made by the exercise of skill in the art within the scope of the invention.

We claim:

1. An aircraft power plan comprising, in combination, an engine, a propeller, torque transmitting coupling means connecting the engine and propeller, the engine providing the sole power source for the said propeller for propulsion of the aircraft, the said coupling means transmitting power from the propeller to the engine upon windmilling of the propeller; torque measuring means responsive to the torque transmitted by the coupling means from the propeller to the engine during windmilling of the propeller, the said measuring means discriminating between torque values less than and those greater than a predetermined substantial value of torque during such windmilling; means operative to disable the propeller from transmitting power to the engine; and means actuated by the said measuring means upon occurrence of windmilling torque values greater than the said predetermined substantial value operating the said disabling means.

2. An aircraft power plant comprising, in combination, an engine, a propeller, torque transmitting coupling means connecting the engine and propeller, the engine providing the sole power source for the said propeller for propulsion of the aircraft, the said coupling means transmitting power from the propeller to the engine upon windmilling of the propeller; torque measuring means responsive to the torque transmitted by the coupling means from the propeller to the engine during windmilling of the propeller, the said measuring means discriminating between torque values less than and those greater than a predetermined substantial value of torque during such windmilling; means operative to feather the propeller and thereby disable the propeller from transmitting power to the engine; and means actuated by the said measuring means upon occurrence of windmilling torque values greater than the said predetermined substantial value operating the said feathering means.

3. An aircraft power plant comprising, in combination an engine, a propeller, torque transmitting coupling means connecting the engine and propeller, the engine providing the sole power source for the said propeller for propulsion of the aircraft, the said coupling means transmitting power from the propeller to the engine upon windmilling of the propeller; torque measuring means responsive to the torque transmitted by the coupling means from the propeller to the engine during windmilling of the propeller, the said measuring means discriminating between torque values less than and those greater than a predetermined substantial value of torque during such windmilling; means operative to decouple the propeller from the engine and thereby disable the propeller from transmitting power to the engine; and means actuated by the said measuring means upon occurrence of windmilling torque values greater than the said predetermined substantial value operating the said decoupling means.

References Cited in the file of this patent

UNITED STATES PATENTS

| | | |
|---|---|---|
| 2,300,419 | Hammond | Nov. 3, 1942 |
| 2,462,824 | Zimmerman et al. | Feb. 22, 1949 |
| 2,595,345 | Engelhardt et al. | May 6, 1952 |
| 2,602,517 | Schroeder et al. | July 8, 1952 |
| 2,605,849 | Bordelon | Aug. 5, 1952 |
| 2,665,082 | Anderson | Jan. 5, 1954 |
| 2,732,019 | Stebbins | Jan. 24, 1956 |

FOREIGN PATENTS

| | | |
|---|---|---|
| 132,502 | Australia | May 26, 1949 |
| 612,652 | Great Britain | Nov. 16, 1948 |

OTHER REFERENCES

"Aviation Week" issue, dated June 28, 1948 (page 23 relied upon).